(12) United States Patent
Furusawa

(10) Patent No.: US 11,331,957 B2
(45) Date of Patent: May 17, 2022

(54) PNEUMATIC TIRE

(71) Applicant: The Yokohama Rubber Co., LTD., Tokyo (JP)

(72) Inventor: Hiroshi Furusawa, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 396 days.

(21) Appl. No.: 16/474,532

(22) PCT Filed: Dec. 27, 2017

(86) PCT No.: PCT/JP2017/047129
§ 371 (c)(1),
(2) Date: Jun. 27, 2019

(87) PCT Pub. No.: WO2018/154969
PCT Pub. Date: Aug. 30, 2018

(65) Prior Publication Data
US 2020/0023688 A1  Jan. 23, 2020

(30) Foreign Application Priority Data
Feb. 22, 2017 (JP) .............................. JP2017-031133

(51) Int. Cl.
*B60C 11/11* (2006.01)
*B60C 11/13* (2006.01)
(Continued)

(52) U.S. Cl.
CPC .............. *B60C 11/13* (2013.01); *B60C 11/01* (2013.01); *B60C 11/0309* (2013.01);
(Continued)

(58) Field of Classification Search
CPC ..... B60C 2011/0365; B60C 2011/0358; B60C 11/13; B60C 11/1384; B60C 11/1392;
(Continued)

(56) References Cited

U.S. PATENT DOCUMENTS 5,924,464 A * 7/1999 White ................. B60C 11/0323
152/209.21
2010/0326577 A1  12/2010 Iwai
(Continued)

FOREIGN PATENT DOCUMENTS

DE  11 2014 006 530  12/2016
JP  09240220 A * 9/1997 ........... B60C 11/047
(Continued)

OTHER PUBLICATIONS

Machine Translation: JP-2013163404-A, Sawada, Hiroki, (Year: 2021).*

(Continued)

*Primary Examiner* — Kendra Ly
(74) *Attorney, Agent, or Firm* — Thorpe North & Western

(57) ABSTRACT

A pneumatic tire includes lug grooves arranged in a circumferential direction in a tread surface of a land portion defined by two main grooves adjacent in a lateral direction, the lug grooves each crossing the circumferential direction and communicating at both ends with the main grooves, defining the land portion in the circumferential direction. A notch portion is formed on an opening edge of the lug grooves. The notch portion is cutout from the tread surface inward in a radial direction. The lug grooves have a maximum groove width at a position from 30% to 70% of a lateral direction dimension of the land portion from one of the main grooves and a groove width that decreases from the maximum groove width to the main grooves. The notch portion has a notch width that increases from a position of the maximum groove width of the lug grooves to the main grooves.

10 Claims, 11 Drawing Sheets

(51) Int. Cl.
  *B60C 11/01* (2006.01)
  *B60C 11/03* (2006.01)
(52) U.S. Cl.
  CPC ... *B60C 11/1392* (2013.01); *B60C 2011/0341* (2013.01); *B60C 2011/0365* (2013.01)
(58) Field of Classification Search
  CPC ..... B60C 2011/0369; B60C 2011/0367; B60C 11/1369
  USPC .................................................. 152/209.15
  See application file for complete search history.

(56) References Cited

U.S. PATENT DOCUMENTS

| | | | |
|---|---|---|---|
| 2012/0267021 A1* | 10/2012 | Guichon | B60C 11/1392 152/209.24 |
| 2016/0101655 A1 | 4/2016 | Shibayama | |
| 2016/0152086 A1* | 6/2016 | Kawakita | B60C 11/1376 152/209.1 |
| 2016/0257172 A1* | 9/2016 | Mukai | B60C 11/1392 |

FOREIGN PATENT DOCUMENTS

| | | | | | |
|---|---|---|---|---|---|
| JP | 10006714 | A | * | 1/1998 | ......... B60C 11/1369 |
| JP | 2006218946 | A | * | 8/2006 | ......... B60C 11/1384 |
| JP | 2006321253 | A | * | 11/2006 | |
| JP | 2007331656 | A | * | 12/2007 | |
| JP | 2009-067244 | | | 4/2009 | |
| JP | 2010215103 | A | * | 9/2010 | |
| JP | 2010-280266 | | | 12/2010 | |
| JP | 2012011846 | A | * | 1/2012 | |
| JP | 2013163404 | A | * | 8/2013 | |
| JP | 2014097799 | A | * | 5/2014 | |
| JP | 2015-024818 | | | 2/2015 | |
| JP | 2016-078475 | | | 5/2016 | |
| JP | 2016-141157 | | | 8/2016 | |
| JP | 2016-168911 | | | 9/2016 | |
| JP | 2016-175576 | | | 10/2016 | |
| WO | WO 2009/034791 | | | 3/2009 | |
| WO | WO 2015/145910 | | | 10/2015 | |

OTHER PUBLICATIONS

Machine Translation: JP-2006321253-A, Yoshino, Mitsuhiro, (Year: 2021).*
Machine Translation: JP-09240220-A, Kano, Ichiro, (Year: 2021).*
Machine Translation: JP-10006714-A, Chaen, Tatsuro, (Year: 2021).*
Machine Translation: JP-2014097799-A, Ishizaka Takahide, (Year: 2021).*
Machine Translation: JP-2012011846-A, Hoshiba, Takashi, (Year: 2021).*
Machine Translation: JP-2006218946-A, Gomyo, Takashi, (Year: 2021).*
Machine Translation: JP-2007331656-A, Nakayama, Taketo, (Year: 2021).*
Machine Translation: JP-2010215103-A, ISHIZAKA, Takahide, (Year: 2021).*
International Search Report for International Application No. PCT/JP2017/047129 dated Apr. 10, 2018, 3 pages, Japan.

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|
| BOTH ENDS OF LUG GROOVES COMMUNICATE WITH MAIN GROOVES | YES | YES | YES | YES | YES | YES | YES | YES | YES | YES |
| LUG GROOVE MAXIMUM GROOVE WIDTH POSITION: RATIO TO MAIN GROOVE WITH RESPECT TO TIRE LATERAL DIRECTION DIMENSION W OF LAND PORTION (%) | 50 | 50 | 50 | 50 | 50 | 50 | 50 | 50 | 50 | 50 |
| NOTCH PORTION | YES | YES | YES | YES | YES | YES | YES | YES | YES | YES |
| NOTCH DEPTH OF NOTCH PORTION (mm) | 2.0 | 2.0 | 2.0 | 2.0 | 2.0 | 2.0 | 2.0 | 0.5 | 3.0 | 2.0 |
| LUG GROOVE MAXIMUM GROOVE WIDTH POSITION | GROOVE WIDTH OF LUG GROOVE (mm) | 3.0 | 3.0 | 3.0 | 3.0 | 3.0 | 3.0 | 3.0 | 3.0 | 3.0 | 3.0 |
| | GROOVE DEPTH OF LUG GROOVE (mm) | 6.0 | 6.0 | 6.0 | 6.0 | 6.0 | 6.0 | 6.0 | 6.0 | 6.0 | 6.0 |
| | NOTCH WIDTH OF NOTCH PORTION (mm); LEADING/TRAILING | 0.5/0.5 | 0.5/0.5 | 0.5/0.5 | 0.5/0.5 | 0.5/0.5 | 0.5/0.5 | 0.5/0.5 | 0.5/0.5 | 0.5/0.5 | 0.5/0.5 |
| 0.50 L | GROOVE WIDTH OF LUG GROOVE (mm) | 3.0 | 3.0 | 2.5 | 2.5 | 2.5 | 2.5 | 2.8 | 2.5 | 2.5 | 2.5 |
| | NOTCH WIDTH OF NOTCH PORTION (mm); LEADING/TRAILING | 0.5/0.5 | 0.9/0.9 | 0.9/0.9 | 0.8/0.8 | 0.6/0.1 | 0.6/0.8 | 0.6/0.8 | 0.8/0.8 | 0.8/0.8 | 0.8/0.8 |
| 0.80 L | GROOVE WIDTH OF LUG GROOVE (mm) | 3.0 | 3.0 | 2.2 | 2.2 | 2.2 | 2.2 | 2.6 | 2.2 | 2.2 | 2.2 |
| | NOTCH WIDTH OF NOTCH PORTION (mm); LEADING/TRAILING | 0.5/0.5 | 1.3/1.3 | 1.3/1.3 | 1.0/1.0 | 0.7/1.3 | 0.7/1.0 | 0.7/1.0 | 1.0/1.0 | 1.0/1.0 | 1.0/1.0 |
| 1.00 L | GROOVE DEPTH OF LUG GROOVE (mm) | 3.0 | 3.0 | 2.0 | 2.0 | 2.0 | 2.0 | 1.5 | 2.0 | 2.0 | 2.0 |
| | | 6.0 | 6.0 | 6.0 | 6.0 | 6.0 | 2.5 | 2.5 | 6.0 | 6.0 | 6.0 |
| | NOTCH WIDTH OF NOTCH PORTION (mm); LEADING/TRAILING | 0.5/0.5 | 1.5/1.5 | 1.5/1.5 | 1.1/1.1 | 0.8/1.4 | 0.8/1.4 | 1.4/2.0 | 1.1/1.1 | 1.1/1.1 | 1.1/1.1 |
| SIDE WHEN TIRE IS MOUNTED ON VEHICLE WITH SMALLER GROOVE WIDTH AT END OF LUG GROOVE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE | VEHICLE INNER SIDE | VEHICLE INNER SIDE |
| QUIETNESS PERFORMANCE | 100 | 95 | 103 | 105 | 107 | 110 | 113 | 107 | 103 | 102 |
| WET PERFORMANCE | 100 | 105 | 106 | 105 | 108 | 108 | 110 | 103 | 107 | 105 |

FIG. 9

| | CONVENTIONAL EXAMPLE | COMPARATIVE EXAMPLE | EXAMPLE 1 | EXAMPLE 2 | EXAMPLE 3 |
|---|---|---|---|---|---|
| BOTH ENDS OF LUG GROOVES COMMUNICATE WITH MAIN GROOVES | YES | YES | YES | YES | YES |
| LUG GROOVE MAXIMUM GROOVE WIDTH POSITION: RATIO TO MAIN GROOVE WITH RESPECT TO TIRE LATERAL DIRECTION DIMENSION W OF LAND PORTION (%) | 50 | 50 | 50 | 50 | 50 |
| NOTCH PORTION | YES | YES | YES | YES | YES |
| NOTCH DEPTH OF NOTCH PORTION (mm) | 2.0 | 2.0 | 2.0 | 2.0 | 2.0 |
| LUG GROOVE MAXIMUM GROOVE WIDTH POSITION — GROOVE WIDTH OF LUG GROOVE (mm) | 3.0 | 3.0 | 3.0 | 3.0 | 3.0 |
| LUG GROOVE MAXIMUM GROOVE WIDTH POSITION — GROOVE DEPTH OF LUG GROOVE (mm) | 6.0 | 6.0 | 6.0 | 6.0 | 6.0 |
| LUG GROOVE MAXIMUM GROOVE WIDTH POSITION — NOTCH WIDTH OF NOTCH PORTION (mm): LEADING/TRAILING | 0.5/0.5 | 0.5/0.5 | 0.5/0.5 | 0.5/0.5 | 0.5/0.5 |
| 0.50 L — GROOVE WIDTH OF LUG GROOVE (mm) | 3.0 | 3.0 | 2.5 | 2.5 | 2.5 |
| 0.50 L — NOTCH WIDTH OF NOTCH PORTION (mm): LEADING/TRAILING | 0.5/0.5 | 0.9/0.9 | 0.9/0.9 | 0.8/0.8 | 0.6/0.1 |
| 0.80 L — GROOVE WIDTH OF LUG GROOVE (mm) | 3.0 | 3.0 | 2.2 | 2.2 | 2.2 |
| 0.80 L — NOTCH WIDTH OF NOTCH PORTION (mm): LEADING/TRAILING | 0.5/0.5 | 1.3/1.3 | 1.3/1.3 | 1.0/1.0 | 0.7/1.3 |
| 1.00 L — GROOVE WIDTH OF LUG GROOVE (mm) | 3.0 | 3.0 | 2.0 | 2.0 | 2.0 |
| 1.00 L — GROOVE DEPTH OF LUG GROOVE (mm) | 6.0 | 6.0 | 6.0 | 6.0 | 6.0 |
| 1.00 L — NOTCH WIDTH OF NOTCH PORTION (mm): LEADING/TRAILING | 0.5/0.5 | 1.5/1.5 | 1.5/1.5 | 1.1/1.1 | 0.8/1.4 |
| SIDE WHEN TIRE IS MOUNTED ON VEHICLE WITH SMALLER GROOVE WIDTH AT END OF LUG GROOVE | VEHICLE OUTER SIDE | VEHICLE OUTER SIDE | VEHICLE OUTER SIDE | VEHICLE OUTER SIDE | VEHICLE OUTER SIDE |
| QUIETNESS PERFORMANCE | 100 | 95 | 103 | 105 | 107 |
| WET PERFORMANCE | 100 | 105 | 106 | 105 | 108 |

FIG. 9A

| | EXAMPLE 4 | EXAMPLE 5 | EXAMPLE 6 | EXAMPLE 7 | EXAMPLE 8 |
|---|---|---|---|---|---|
| BOTH ENDS OF LUG GROOVES COMMUNICATE WITH MAIN GROOVES | YES | YES | YES | YES | YES |
| LUG GROOVE MAXIMUM GROOVE WIDTH POSITION: RATIO TO MAIN GROOVE WITH RESPECT TO TIRE LATERAL DIRECTION DIMENSION W OF LAND PORTION (%) | 50 | 50 | 50 | 50 | 50 |
| NOTCH PORTION | YES | YES | YES | YES | YES |
| NOTCH DEPTH OF NOTCH PORTION (mm) | 2.0 | 2.0 | 0.5 | 3.0 | 2.0 |
| LUG GROOVE MAXIMUM GROOVE WIDTH POSITION — GROOVE WIDTH OF LUG GROOVE (mm) | 3.0 | 3.0 | 3.0 | 3.0 | 3.0 |
| LUG GROOVE MAXIMUM GROOVE WIDTH POSITION — GROOVE DEPTH OF LUG GROOVE (mm) | 6.0 | 6.0 | 6.0 | 6.0 | 6.0 |
| LUG GROOVE MAXIMUM GROOVE WIDTH POSITION — NOTCH WIDTH OF NOTCH PORTION (mm): LEADING/TRAILING | 0.5/0.5 | 0.5/0.5 | 0.5/0.5 | 0.5/0.5 | 0.5/0.5 |
| 0.50 L — GROOVE WIDTH OF LUG GROOVE (mm) | 2.5 | 2.8 | 2.5 | 2.5 | 2.5 |
| 0.50 L — NOTCH WIDTH OF NOTCH PORTION (mm): LEADING/TRAILING | 0.6/0.8 | 0.6/0.8 | 0.8/0.8 | 0.8/0.8 | 0.8/0.8 |
| 0.80 L — GROOVE WIDTH OF LUG GROOVE (mm) | 2.2 | 2.6 | 2.2 | 2.2 | 2.2 |
| 0.80 L — NOTCH WIDTH OF NOTCH PORTION (mm): LEADING/TRAILING | 0.7/1.0 | 0.7/1.0 | 1.0/1.0 | 1.0/1.0 | 1.0/1.0 |
| 1.00 L — GROOVE WIDTH OF LUG GROOVE (mm) | 2.0 | 1.5 | 2.0 | 2.0 | 2.0 |
| 1.00 L — GROOVE DEPTH OF LUG GROOVE (mm) | 2.5 | 2.5 | 6.0 | 6.0 | 6.0 |
| 1.00 L — NOTCH WIDTH OF NOTCH PORTION (mm): LEADING/TRAILING | 0.8/1.4 | 1.4/2.0 | 1.1/1.1 | 1.1/1.1 | 1.1/1.1 |
| SIDE WHEN TIRE IS MOUNTED ON VEHICLE WITH SMALLER GROOVE WIDTH AT END OF LUG GROOVE | VEHICLE OUTER SIDE | VEHICLE OUTER SIDE | VEHICLE OUTER SIDE | VEHICLE INNER SIDE | VEHICLE INNER SIDE |
| QUIETNESS PERFORMANCE | 110 | 113 | 107 | 103 | 102 |
| WET PERFORMANCE | 108 | 110 | 103 | 107 | 105 |

FIG. 9B

PNEUMATIC TIRE

TECHNICAL FIELD

The present technology relates to a pneumatic tire.

BACKGROUND ART

A known tire, for example, the tire described in Japan Unexamined Patent Publication No. 2010-280266, is designed to suppress small stones getting wedged and effectively reduce air column resonance. The tire includes a rib-like land portion extending in a tire circumferential direction adjacent to a circumferential groove extending in the tire circumferential direction; and a first groove portion and a second groove portion adjacent to the first groove portion, and a dividing wall portion adjacent to the first groove portion and the second groove portion formed in the rib-like land portion. The first groove portion and the second groove portion each include an air chamber portion that forms a closed space when the rib-like land portion comes into contact with the road surface and a constriction groove portion that communicates with the air chamber portion and the circumferential groove. One end of the constriction groove portion communicates with the closed space formed by the air chamber portion and the road surface, and the other end of the constriction groove portion communicates with the circumferential groove. A volume of space formed by the constriction groove portion and the road surface is less than a volume of the closed space formed by the air chamber portion and the road surface. The first groove portion and the second groove portion extend at an incline with respect to the tire circumferential direction.

In the tire described in Japan Unexamined Patent Publication No. 2010-280266, a Helmholtz type resonator including the air chamber portion and the constriction groove portion is provided to reduce air column resonance. Additionally, with the tire described in Patent Document 1, the first groove portion and the second groove portion extend in a direction inclined with respect to the tire circumferential direction, and when the rib-like land portion leads onto or kicks off the road surface, the groove width of the first groove portion and the second groove portion increases, allowing for stones wedged in the first groove portion and the second groove portion to be discharged.

However, in the tire described in Japan Unexamined Patent Publication No. 2010-280266, to reduce air column resonance, the first groove portion and the second groove portion are formed so that the other end of the constriction groove portion communicates with the circumferential groove. This reduces drainage performance and makes it difficult to ensure wet performance (braking performance on wet road surfaces).

SUMMARY

The present technology provides a pneumatic tire that can provide reduced pattern noise and ensure wet performance.

A pneumatic tire according to an aspect of the present technology, comprises:

in a tread surface, main grooves extending in a tire circumferential direction;

a land portion defined by two of the main grooves adjacent in a tire lateral direction;

lug grooves arranged in the tire circumferential direction in the tread surface of the land portion, the lug grooves each crossing the tire circumferential direction and communicating at both ends with the main grooves, defining the land portion in the tire circumferential direction; and a notch portion formed on an opening edge of the lug grooves, the notch portion being a cutout from the tread surface cut inward in a tire radial direction; wherein the lug grooves have a maximum groove width at a position from 30% to 70% of a tire lateral direction dimension of the land portion from one of the main grooves and a groove width that decreases from the maximum groove width to the main grooves; and the notch portion has a notch width that increases from a position of the maximum groove width of the lug grooves to the main grooves.

According to the pneumatic tire, the lug groove has the groove width that gradually decreases toward the main grooves. This allows the noise emitting outward from the lug groove in the tire lateral direction to be suppressed. Moreover, the notch portion provided on the opening edge of the lug groove has the notch width that gradually increases toward the main grooves. This allows the drainage performance in the lug groove to be increased. As a result, pattern noise can be decreased and wet performance (braking performance on wet road surfaces) can be maintained.

In a pneumatic tire according to an aspect of the present technology, preferably relationships $0 \leq x0 < x$ and $0.2(y0-y)+x0 \leq x \leq 2.0(y0-y)+x0$ are satisfied, where $y0$ is a maximum groove width of the lug grooves, $x0$ is the notch width of the notch portion at the maximum groove width position of the lug grooves, $y$ is a groove width of the lug grooves at a discretionary position located further outward in the tire lateral direction than the maximum groove width position of the lug grooves, and $x$ is a notch width of the notch portion at a discretionary position.

According to the pneumatic tire, the notch width of the notch portion is set in accordance with the change in the groove width of the lug groove, and when the notch width of the notch portion is $0.2(y0-y)+x0$ or greater, an effect of improving drainage performance can be significantly obtained. When the notch width of the notch portion is $2.0(y0-y)+x0$ or less, the effect of suppressing noise emitting outward in the tire lateral direction from the lug groove can be significantly obtained. As a result, pattern noise can be reduced and an effect of ensuring wet performance (braking performance on wet road surfaces) can be significantly obtained.

In a pneumatic tire according to an aspect of the present technology, preferably the notch portion has a notch depth from the tread surface inward in the tire radial direction of from 0.5 mm to 3.0 mm.

According to this pneumatic tire, with the notch depth of the notch portion being 0.5 mm or greater, the effect of ensuring drainage performance can be significantly obtained. Meanwhile, with the notch depth of the notch portion being 3.0 mm or less, the effect of suppressing noise emission can be significantly obtained.

In a pneumatic tire according to an aspect of the present technology, preferably a rotation direction is designated; and a relationship $xb < xa \leq 3.0xb$ is satisfied, where $xa$ is a notch width of the notch portion located on a trailing side of the land portion in the tire circumferential direction with respect to the lug grooves, and $xb$ is a notch width of the notch portion located on a leading side.

According to the pneumatic tire, with the notch width of the notch portion on the trailing side of the land portion in the tire circumferential direction with respect to the lug groove being greater than the notch width of the notch portion on the leading side, allows deformation (twisting) on the trailing side to be suppressed and rigidity ensured more than on the leading side with respect to the lug groove. As a result, heal and toe wear can be suppressed and wear resistance performance can be improved.

In a pneumatic tire according to an aspect of the present technology, preferably the lug grooves have a groove depth G at a position where the lug grooves communicate with the main grooves and a groove depth G0 at a maximum groove width position that satisfies a range $0.2 \times G0 \leq G \leq 0.6 \times G0$.

According to this pneumatic tire, in the lug groove, the groove depth G at the position of the end that communicates with the main groove is less than the groove depth G0 at the position of the maximum groove width. This allows noise emission to be effectively suppressed. By satisfying $0.2 \times G0 \leq G \leq 0.6 \times G0$, drainage performance can be maintained and wet performance can be ensured.

In a pneumatic tire according to an aspect of the present technology, preferably a vehicle inner/outer side orientation when mounted on a vehicle is designated; and the lug grooves have a groove width at a position where the lug grooves communicate with the main grooves that is smaller on the vehicle outer side than on the vehicle inner side.

The vehicle outer side when the tire is mounted on a vehicle has significant problems with noise emission. Thus, according to the pneumatic tire, by the groove width of the lug groove on the vehicle outer side being less than the groove width on the vehicle inner side, noise emission can be effectively suppressed and a significant effect can be obtained.

In a pneumatic tire according to an aspect of the present technology, preferably at a position $0.50 \times L$, a relationship $0.80 \times y0 \leq y \leq 0.98 \times y0$ is satisfied;

at a position $0.80 \times L$, a relationship $0.60 \times y0 \leq y \leq 0.90 \times y0$ is satisfied; and at a position $1.00 \times L$, a relationship $0.30 \times y0 \leq y \leq 0.50 \times y0$ is satisfied, where L is a tire lateral direction dimension from a maximum groove width position of the lug grooves to a position where the lug grooves communicate with the main grooves, y0 is a maximum groove width of the lug grooves, and y is a groove width of the lug grooves at a discretionary position located further outward in the tire lateral direction than the maximum groove width position of the lug grooves.

According to the pneumatic tire, with the groove width y of the lug groove at or near the end being narrow, groove volume can be ensured, wet performance can be maintained, and an effect of reducing pattern noise can be significantly obtained.

A pneumatic tire according to an embodiment of the present technology can provide reduced pattern noise and wet performance can be maintained.

BRIEF DESCRIPTION OF DRAWINGS

FIGS. 9A-9B include a table showing the results of performance tests of pneumatic tires according to examples of the present technology.

DETAILED DESCRIPTION

Embodiments of the present technology are described in detail below with reference to the drawings. However, the present technology is not limited by the embodiments. Constituents of the embodiments include elements that are essentially identical or that can be substituted or easily conceived by one skilled in the art. Furthermore, the modified examples described in the embodiments can be combined as desired within the scope apparent to one skilled in the art.

Figure 1:
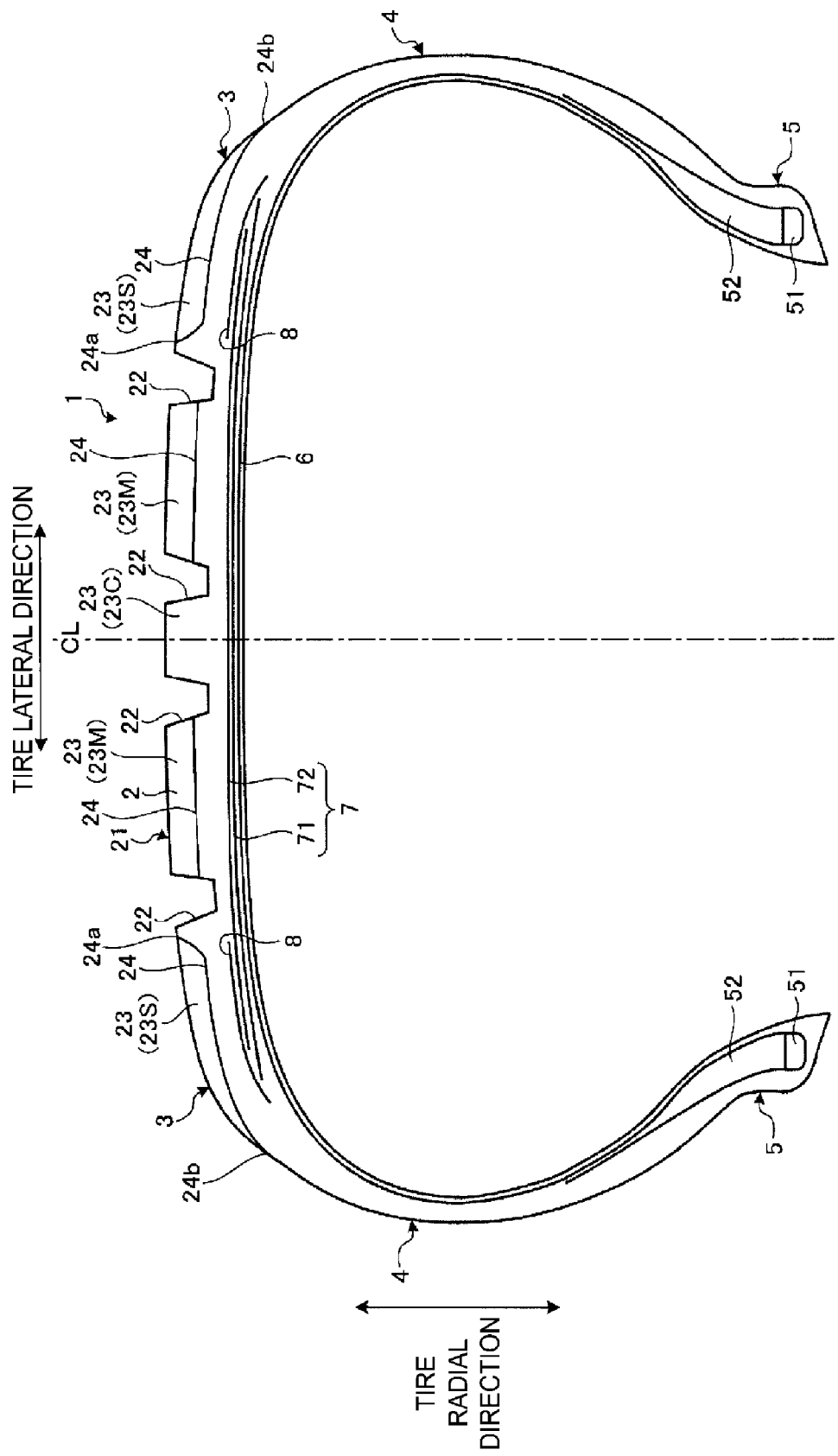
FIG. 1 is a meridian cross-sectional view of a pneumatic tire according to an embodiment of the present technology.

A pneumatic tire according to the present embodiment will be described. FIG. 1 is a meridian cross-sectional view of a pneumatic tire according to the present embodiment.

Herein, "tire radial direction" refers to the direction orthogonal to the rotation axis (not illustrated) of a pneumatic tire 1. "Inward in the tire radial direction" refers to the direction toward the rotation axis in the tire radial direction. "Outward in the tire radial direction" refers to the direction away from the rotation axis in the tire radial direction. "Tire circumferential direction" refers to a circumferential direction with the rotation axis as a center axis. Additionally, "tire lateral direction" refers to a direction parallel with the rotation axis. "Inward in the tire lateral direction" refers to a direction toward a tire equatorial plane (tire equator line) CL in the tire lateral direction. "Outward in the tire lateral direction" refers to a direction away from the tire equatorial plane CL in the tire lateral direction. "Tire equatorial plane CL" refers to the plane orthogonal to the rotation axis of the pneumatic tire 1 that passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 of the present embodiment includes a tread portion 2, shoulder portions 3 on opposite sides of the tread portion 2, and sidewall portions 4 and bead portions 5 continues from the shoulder portions 3 in that order. Additionally, the pneumatic tire 1 includes a carcass layer 6, a belt layer 7, and a belt reinforcing layer 8. The pneumatic tire 1 according to the present embodiment is mainly used for passenger vehicles but may also be a heavy duty pneumatic tire for trucks and buses.

The tread portion 2 is made of a rubber material (tread rubber) and is exposed on the outermost side of the pneumatic tire 1 in the tire radial direction, with the surface thereof constituting the profile of the pneumatic tire 1. A tread surface 21 is formed on an outer circumferential surface of the tread portion 2, in other words, on a road contact surface that comes into contact with a road surface when running. A plurality (four in the present embodiment) of main grooves 22 extending in the tire circumferential direction are disposed side by side in the tire lateral direction in the tread surface 21. Moreover, a plurality (five in the present embodiment) of rib-like land portions 23 extending in the tire circumferential direction and parallel with the tire equator line CL are defined in the tread surface 21 by the plurality of main grooves 22. Specifically, in the pneumatic tire 1 of the present embodiment, the land portions 23 include shoulder land portions 23S located outermost in the tire lateral direction, a center land portion 23C centrally located in the tire lateral direction (on the tire equatorial plane CL), and middle land portions 23M located between the shoulder land portions 23S and the center land portion 23C in the tire lateral direction. A plurality of lug grooves 24 extending in the tire circumferential direction and crossing the tire circumferential direction (main grooves 22) are disposed in the tire circumferential direction in the tread surface 21 of the land portions 23. Note that in an embodiment with five or more main grooves 22, a plurality of middle land portions 23M are defined on either side of the tire equatorial plane CL in the tire lateral direction.

The shoulder portions 3 are portions of the tread portion 2 located outward in the tire lateral direction on both sides. Additionally, the sidewall portions 4 are exposed on the outermost sides of the pneumatic tire 1 in the tire lateral direction. The bead portions 5 each include a bead core 51 and a bead filler 52. The bead core 51 is formed by winding a bead wire, which is a steel wire, into an annular shape. The bead filler 52 is a rubber material that is disposed in the space formed by an end portion of the carcass layer 6 in the tire lateral direction being folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of organic fibers (e.g., polyester, rayon, nylon, and the like). The carcass layer 6 is provided with at least one layer.

The belt layer 7 has a multilayer structure in which at least two belts 71, 72 are layered. In the tread portion 2, the belt layer 7 is disposed outward of the carcass layer 6 in the tire radial direction, i.e., on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (for example, from 20 degrees to 30 degrees). The cords are made of steel or organic fibers (polyester, rayon, nylon, or the like). Moreover, the belts 71, 72 overlap each other and are disposed so that the direction of the cords of the respective belts intersect each other.

The belt reinforcing layer 8 is disposed outward of the belt layer 7 in the tire radial direction, i.e., on the outer circumference thereof, and covers the belt layer 7 in the tire circumferential direction. The belt reinforcing layer 8 is made of coating rubber-covered cords (not illustrated) disposed side by side in the tire lateral direction substantially parallel (±5 degrees) with the tire circumferential direction. The cords are made of steel or organic fibers (polyester, rayon, nylon, or the like). The belt reinforcing layer 8 illustrated in FIG. 1 is disposed so as to cover end portions of the belt layer 7 in the tire lateral direction. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire lateral direction so as to cover the entire belt layer 7, and the outer reinforcing layer in the tire radial direction is disposed so as to only cover the end portions of the belt layer 7 in the tire lateral direction. In another example, a configuration with two reinforcing layers may be used, in which both of the reinforcing layers are disposed so as to only cover the end portions of the belt layer 7 in the tire lateral direction. In other words, the belt reinforcing layer 8 overlaps with at least the end portion of the belt layer 7 in the tire lateral direction. Additionally, the belt reinforcing layer 8 is configured by winding a band-like (e.g., with a width of 10 mm) strip material in the tire circumferential direction.

Figure 2:
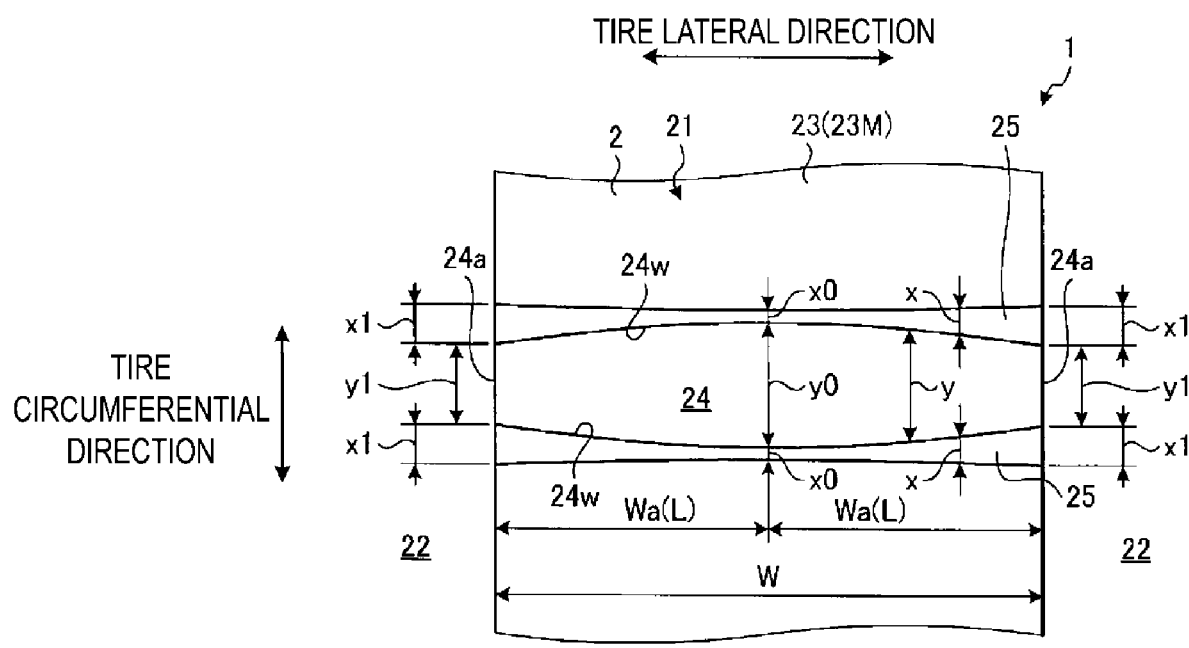
FIG. 2 is an enlarged plan view of a portion of a pneumatic tire according to an embodiment of the present technology.
Figure 3:
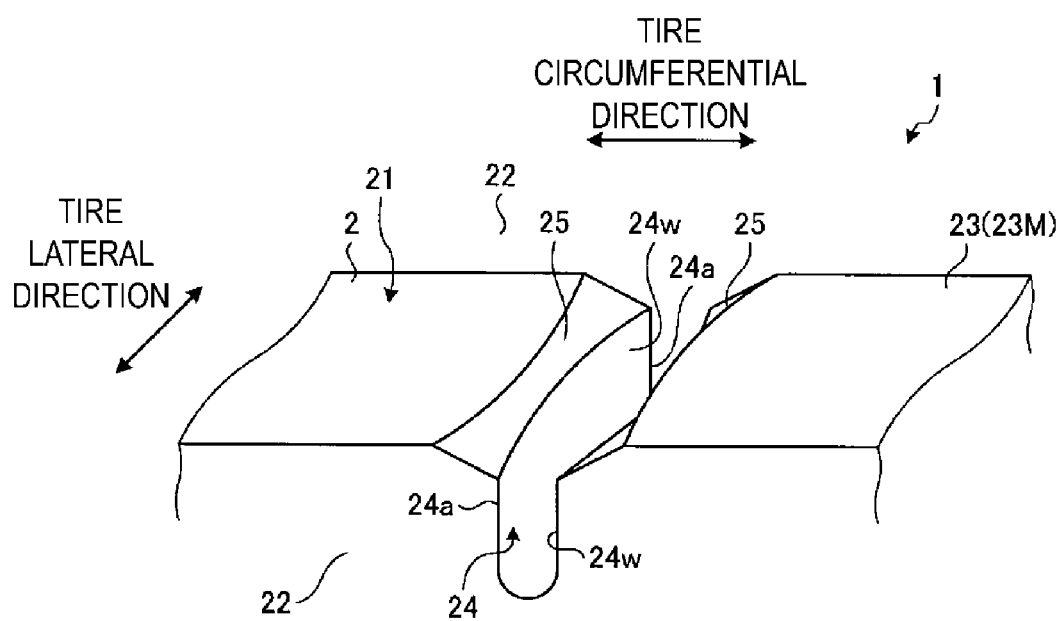
FIG. 3 is an enlarged perspective view of a portion of a pneumatic tire according to an embodiment of the present technology.
Figure 4:
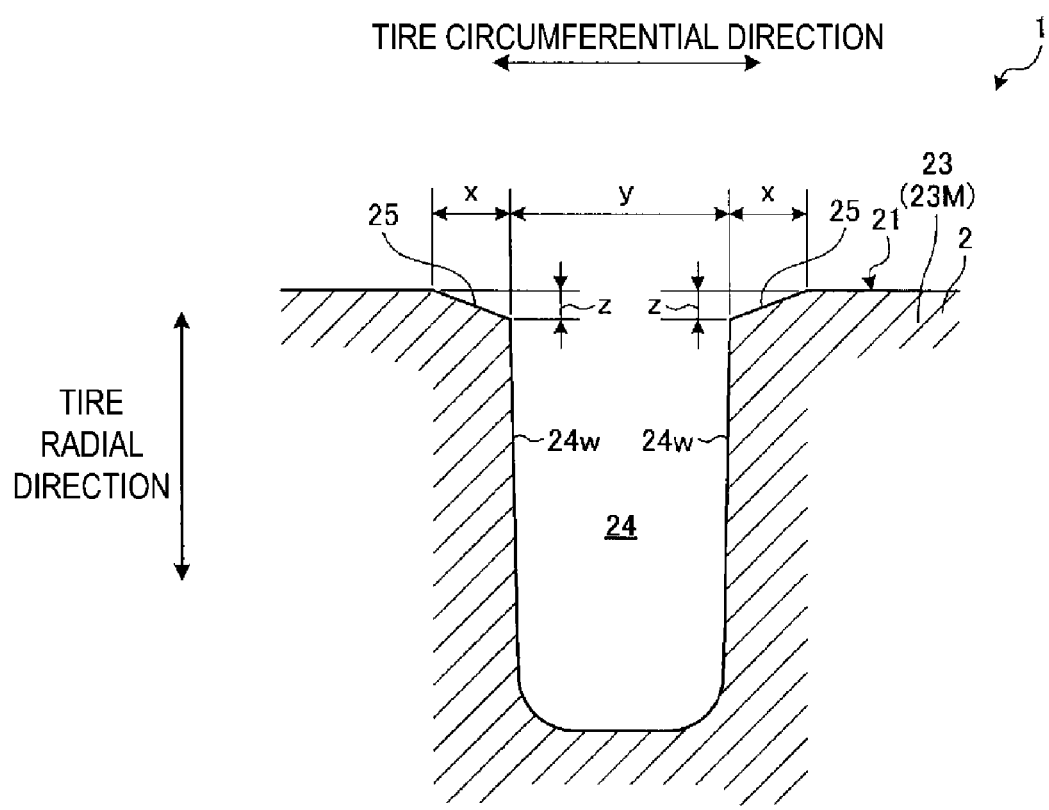
FIG. 4 is an enlarged cross-sectional view of a portion of a pneumatic tire according to an embodiment of the present technology.
Figure 5:
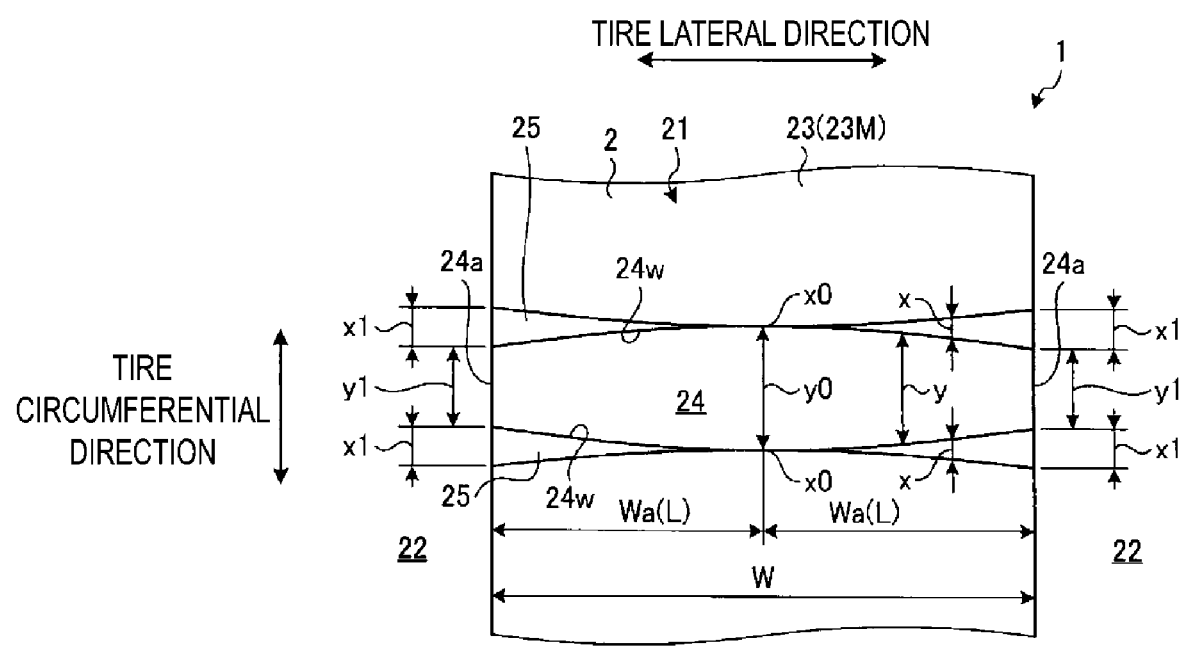
FIG. 5 is an enlarged plan view of a portion of a pneumatic tire according to another embodiment of the present technology.
Figure 6:
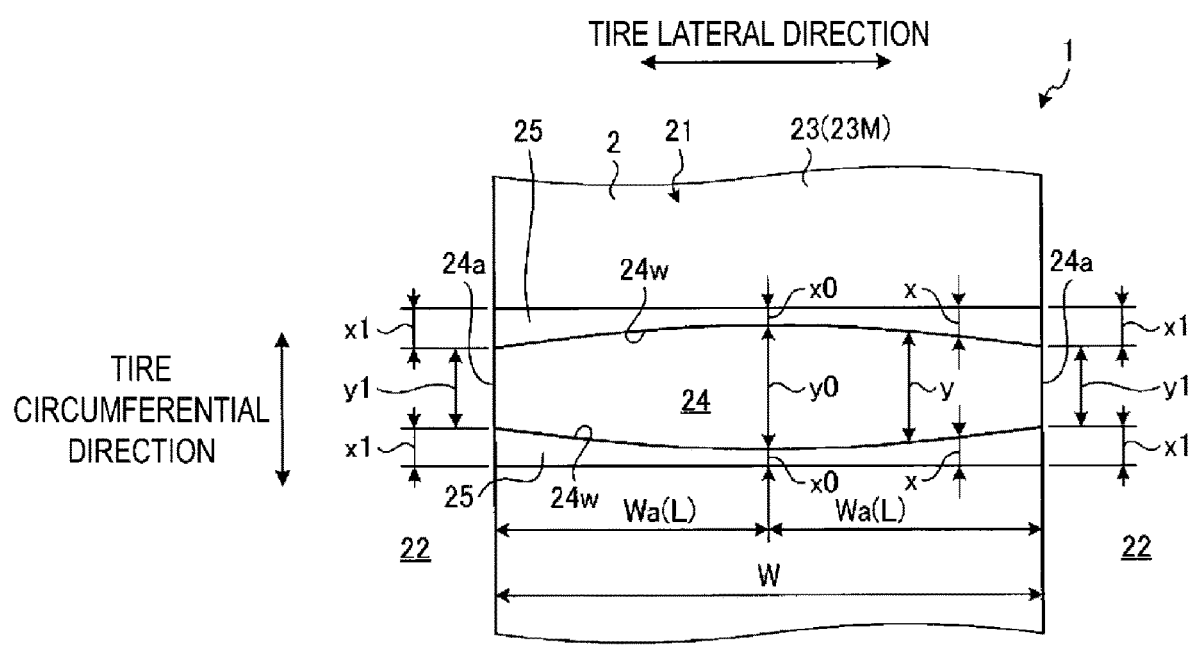
FIG. 6 is an enlarged plan view of a portion of a pneumatic tire according to another embodiment of the present technology.
Figure 7:
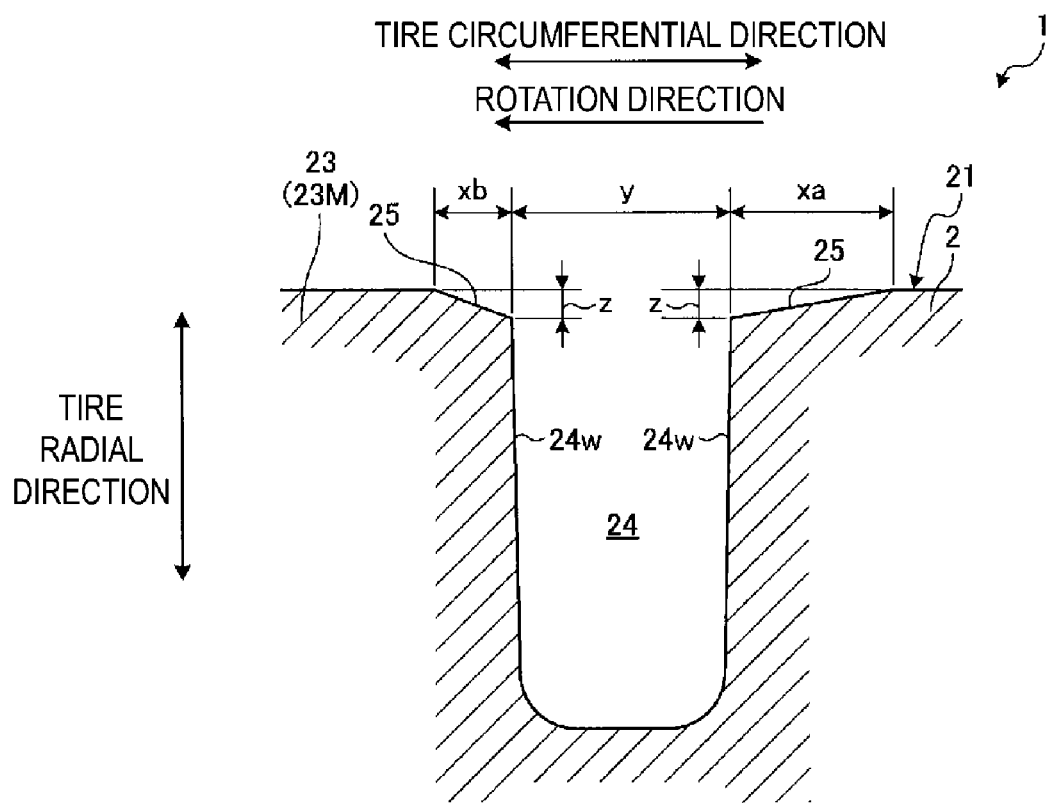
FIG. 7 is an enlarged cross-sectional view of a portion of a pneumatic tire according to another embodiment of the present technology.
Figure 8:
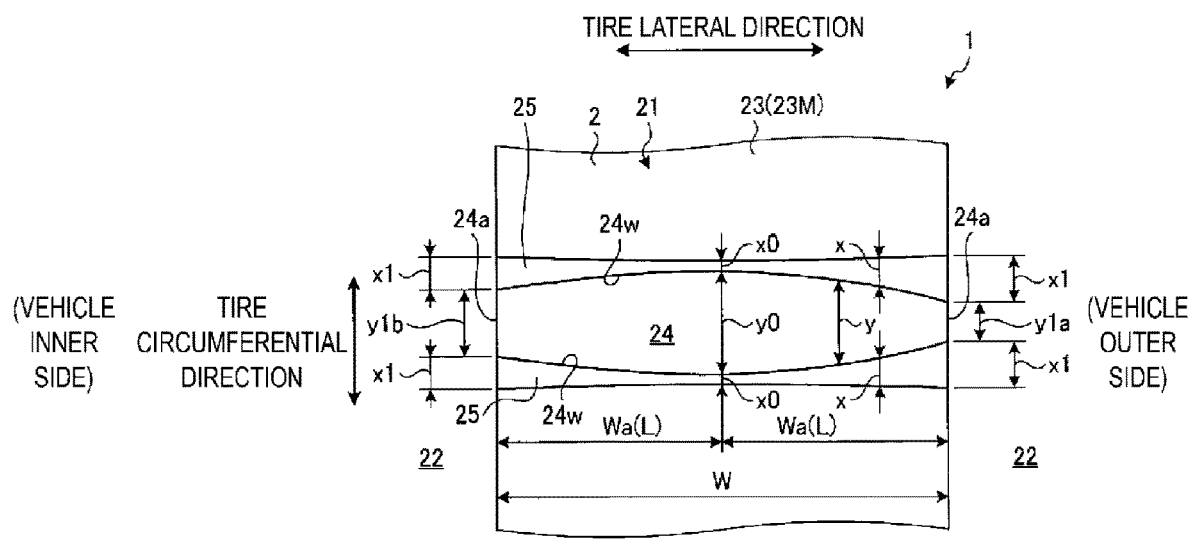
FIG. 8 is an enlarged plan view of a portion of a pneumatic tire according to another embodiment of the present technology.

FIG. 2 is an enlarged plan view of a portion of the pneumatic tire according to the present embodiment. FIG. 3 is an enlarged perspective view of a portion of the pneumatic tire according to the present embodiment. FIG. 4 is an enlarged cross-sectional view of a portion of the pneumatic tire according to the present embodiment. FIG. 5 is an enlarged plan view of a portion of a pneumatic tire according to another embodiment. FIG. 6 is an enlarged plan view of a portion of a pneumatic tire according to another embodiment. FIG. 7 is an enlarged cross-sectional view of a portion of a pneumatic tire according to another embodiment. FIG. 8 is an enlarged plan view of a portion of a pneumatic tire according to another embodiment.

As illustrated in FIGS. 2 to 4, in the tread portion 2 of the pneumatic tire 1 of the present embodiment, the lug groove 24 is formed in the tread surface 21 of the middle land portion 23M, which is one of the land portions 23 defined between the main grooves adjacent to one another in the tire lateral direction. The lug groove 24 of the middle land portion 23M is provided with both ends 24a communicating with the main grooves 22. Thus, the middle land portion 23M is defined into blocks divided in the tire circumferential direction.

In the middle land portion 23M, a notch portion 25 is formed on the opening edge of the lug groove 24. The notch portion 25 is a chamfer-like cutout inclined from the tread surface 21 cut inward in the tire radial direction that communicates with a groove wall 24w of the lug groove 24. Note that the notch portion 25 may be a planar chamfer inclined from the tread surface 21 inward in the tire radial direction or may be a curved surface. Note that in the drawings, the notch portion 25 is provided on both sides in the groove width direction of the lug groove 24 but is only required to be provided on at least one side.

The lug grooves 24 of the middle land portions 23M are formed with a groove width y being a maximum groove width y0 partway along in the tire lateral direction, and the groove width y being a groove width y1 (y1a) that is less than the maximum groove width y0 on the first end 24a side that communicates with one of the main grooves 22, and the groove width y being the groove width y1 (y1b) that is less than the maximum groove width y0 on the second end 24a side that communicates with the other main groove 22. Additionally, the groove width y of the lug groove 24 of the middle land portion 23M refers to the opening width between the groove walls 24w excluding the notch portions 25. As the groove width y increases/decreases, the interval between the groove walls 24w increases/decreases. The lug groove 24 of the middle land portion 23M has a cross-sectional area that progressively decreases from the position of the maximum groove width y0 to the first end 24a side and the second end 24a side. The groove width y1 (y1a, y1b) of both ends 24a of the lug groove 24 of the middle land portion 23M is preferably 1.5 mm or greater in order to ensure drainage performance and to suppress noise emission, and the maximum groove width y0 is preferably 4.5 mm or less in order to suppress noise emission. Additionally, the groove depth (tire radial direction dimension from the groove bottom to the position of the groove width) of the lug groove 24 of the middle land portion 23M is from 2.5 mm to 6.0 mm.

The position of the maximum groove width y0 of the lug groove 24 of the middle land portion 23M is disposed in a range Wa from the position where the end 24a communicates (with either of the main grooves 22) from 30% to 70% of a tire lateral direction dimension W of the middle land portion 23M.

The notch portion 25 provided on the opening edge of the lug groove 24 of the middle land portion 23M has a notch width x that progressively increases to the main grooves 22 to which the ends 24a of the lug groove 24 communicates. In other words, the notch width x of the notch portion 25 has a minimum notch width x0 at the position of the maximum groove width y0 of the lug groove 24, and the notch width x has a maximum notch width x1 at the ends 24a of the lug groove 24. "Notch width x of the notch portion 25" refers to a chamfer width that is inclined from the tread surface 21 inward in the tire radial direction. The notched portion 25 has a cross-sectional area that progressively increases to the ends 24a of the lug groove 24 of the middle land portion 23M.

According to the pneumatic tire 1 configured in such a manner, the lug groove 24 of the middle land portion 23M has the groove width y that gradually decreases toward the ends 24a that communicate with the main grooves 22. This allows the noise emitting outward from the lug groove 24 in the tire lateral direction to be suppressed. Moreover, the notch portion 25 provided on the opening edge of the lug groove 24 of the middle land portion 23M has the notch width x that gradually increases toward the main grooves 22. This allows the drainage performance in the lug groove 24 to be increased. As a result, according to the pneumatic tire 1 of the present embodiment, pattern noise can be decreased and wet performance (braking performance on wet road surfaces) can be maintained.

Additionally, in the pneumatic tire 1 of the present embodiment, the relationships $0 \leq x0 < x$ and $0.2(y0-y)+x0 \leq x \leq 2.0(y0-y)+x0$ are preferably satisfied, where y0 is the maximum groove width of the lug groove 24 of the middle land portion 23S, x0 is the notch width of the notch portion 25 at the maximum groove width y0 position of the lug groove 24, y is the groove width of the lug groove 24 at a discretionary position located further outward in the tire lateral direction than the maximum groove width y0 position of the lug groove 24, and x is the notch width of the notch portion 25 at a discretionary position.

In the configuration illustrated in FIG. 5, $0=x0$ is true, with the notch width x0 of the notch portion 25 at the maximum groove width y0 position of the lug grooves 24 being 0, and the notch portion 25 expanding outward in the tire lateral direction starting from the maximum groove width y0 position of the lug groove 24.

According to the pneumatic tire 1, the notch width x of the notch portion 25 is set in accordance with the change in the groove width y of the lug groove 24 of the middle land portion 23M, and when the notch width x of the notch portion 25 is $0.2(y0-y)+x0$ or greater, an effect of improving drainage performance can be significantly obtained. When the notch width x of the notch portion 25 is $2.0(y0-y)+x0$ or less, the effect of suppressing noise emitting outward in the tire lateral direction from the lug groove 24 can be significantly obtained. As a result, pattern noise can be reduced and an effect of ensuring wet performance (braking performance on wet road surfaces) can be significantly obtained. Note that when the notch width x of the notch portion 25 exceeds $2.0(y0-y)+x0$, the ground contact region of the tread surface 21 of the shoulder land portion 23S decreases and the ground contact pressure increases. As a result, wear resistance performance tends to decrease. According to the pneumatic tire 1, this can be improved.

Note that as illustrated in FIG. 6, the notch portion 25 may have a tire circumferential direction dimension (y+x+x) including the groove width y of the lug groove 24 that is constant $((y0+x0+x0)=(y1+x1+x1))$ in the tire lateral direction of the middle land portion 23M. With such a configuration, the ground contact region of the tread surface 21 of the middle land portion 23M is constant in the tire lateral direction, and uneven wear can be suppressed.

As illustrated in FIG. 4, in the pneumatic tire 1 of the present embodiment, a notch depth z of the notch portion 25 from the tread surface 21 inward in the tire radial direction is preferably from 0.5 mm to 3.0 mm.

According to this pneumatic tire 1, with the notch depth z of the notch portion 25 being 0.5 mm or greater, the effect of ensuring drainage performance can be significantly obtained. Also, with the notch depth z of the notch portion 25 being 3.0 mm or less, the effect of suppressing noise emission can be significantly obtained. Note that to significantly better obtain an effect of suppressing noise emission and ensuring drainage performance, the notch depth z of the notch portion 25 is more preferably from 0.5 mm to 1.5 mm.

As illustrated in FIG. 7, in the pneumatic tire 1 of the present embodiment, the rotation direction is designated, and the relationship $xb < xa \leq 3.0xb$ is preferably satisfied, where xa is the notch width of the notch portion 25 located on the trailing side of the middle land portion 23M in the tire circumferential direction with respect to the lug groove 24, and xb is the notch width of the notch portion 25 located on the leading side.

Although not illustrated in the drawings, the designation of the rotation direction is indicated by an indicator (for example, an arrow that points in the rotation direction when the vehicle travels forward) provided on the sidewall portion 4 on the side surface of the tire located outward of the tread portion 2 in the tire lateral direction.

According to the pneumatic tire 1, with the notch width xa of the notch portion 25 on the trailing side of the middle land portion 23M in the tire circumferential direction with respect to the lug groove 24 being greater than the notch width xb of the notch portion 25 on the leading side, allows deformation (twisting) on the trailing side to be suppressed and rigidity ensured more than on the leading side with respect to the lug groove 24. As a result, heal and toe wear can be suppressed and wear resistance performance can be improved. In this case, the notch depth z of the notch portion 25 on the leading side and the trailing side is equal. Note that, although not illustrated in the drawings, the relationship xb<xa≤3.0xb being satisfied includes the notch portion 25 on the leading side not being provided.

In the pneumatic tire 1 of the present embodiment, the lug groove 24 of the middle land portion 23M preferably has a groove depth G at the position of the end 24a that communicates with the main groove 22 with respect to a groove depth G0 at the position of the maximum groove width y0 that satisfies the range $0.2 \times G0 \leq G \leq 0.6 \times G0$.

According to this pneumatic tire 1, in the lug groove 24 of the middle land portion 23M, the groove depth G at the position of the end 24a that communicates with the main groove 22 is less than the groove depth G0 at the position of the maximum groove width y0. This allows noise emission to be effectively suppressed. By satisfying $0.2 \times G0 \leq G \leq 0.6 \times G0$, drainage performance can be maintained and wet performance can be ensured.

Additionally, in the pneumatic tire 1 of the present embodiment, as illustrated in FIG. 8, the vehicle inner/outer side orientation when the tire is mounted on a vehicle is designated, and the lug groove 24 of the middle land portion 23M preferably has the groove width y at a position where the lug groove 24 communicates with the main groove 22 such that the groove width y1a on the vehicle outer side that is less than the groove width y1b on the vehicle inner side.

The designated vehicle inner/outer side orientation when the tire is mounted on a vehicle determines the orientation of the rim with respect to the vehicle inner side and the vehicle outer side in the tire lateral direction when, for example, the tire is mounted on a rim. Thus, the pneumatic tire 1, when mounted on a rim, has a designated vehicle inner/outer side orientation in the tire lateral direction when mounted on a vehicle. The pneumatic tire 1 includes a mounting direction indicator portion (not illustrated) that indicates the mounting direction with respect to a vehicle. The mounting direction indicator portion, for example, is constituted by a mark or ridges/grooves on the sidewall portion 4. For example, Economic Commission for Europe Regulation 30 (ECE R30) requires that a mounting direction indicator portion is provided on the sidewall portion 4 on the vehicle outer side when the tire is mounted on a vehicle.

The vehicle outer side when the tire is mounted on a vehicle has significant problems with noise emission. Thus, according to the pneumatic tire 1, with the groove width y1a of the lug groove 24 of the middle land portion 23M on the vehicle outer side being less than the groove width y1b on the vehicle inner side, noise emission can be effectively suppressed and a significant effect can be obtained.

Additionally, in the pneumatic tire 1 of the present embodiment, preferably, at the position $0.50 \times L$, a relationship $0.80 \times y0 \leq y \leq 0.98 \times y0$ is satisfied; at the position $0.80 \times L$, a relationship $0.60 \times y0 \leq y \leq 0.90 \times y0$ is satisfied; and at the position $1.00 \times L$, a relationship $0.30 \times y0 \leq y \leq 0.50 \times y0$ is satisfied, where L is the tire lateral direction dimension from the position of the maximum groove width y0 of the lug groove 24 to the position where the lug groove 24 communicates with the main groove 22 (the end 24a), and y is the groove width of the lug groove at a discretionary position located further outward in the tire lateral direction than the position of the maximum groove width y0 of the lug groove 24.

According to the pneumatic tire 1, with the groove width y of the lug groove 24 of the middle land portion 23M at or near the end 24a being narrow, groove volume can be ensured, wet performance can be maintained, and an effect of reducing pattern noise can be significantly obtained.

Note that in the embodiment described above, the lug groove 24 and the notch portion 25 provided in the middle land portion 23M have been described. However, similar effects can be obtained by providing the lug groove 24 and the notch portion 25 in the center land portion 23C.

EXAMPLES

In the examples, performance tests for quietness performance (pattern noise) and wet performance (braking performance on wet road surfaces) were performed on a plurality of types of pneumatic tires of different conditions (see FIGS. 9A-9B).

In the performance testing, pneumatic tires (test tires) having a tire size of 185/65R15 were mounted on a regular rim and inflated to the regular internal pressure. Then, the pneumatic tire was mounted on a test vehicle (a front wheel drive vehicle having an engine displacement of 1200 cc).

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In the evaluation method for quietness performance, cabin noise (dB) was measured when the test vehicle drove on an ISO-specified road surface of a test course at a speed of 50 km/h. The measurement values were expressed as index values and evaluated, with the Conventional Example being assigned as the reference value (100). In the evaluation, larger values indicate less cabin noise (pattern noise) and excellent quietness performance.

In the evaluation method for wet performance, the distance the test vehicle took to stop on a wet road surface with a water depth of 1 mm after engaging the brakes at an initial speed of 100 km/h was measured. The reciprocals of the measurement values were taken and expressed as index values and evaluated, with the Conventional Example being assigned as the reference value (100). In the evaluation, larger values indicate excellent wet performance.

In FIGS. 9A-9B, in the pneumatic tires of the Conventional Example, the Comparative Example, and Examples 1 to 8, four main grooves are provided in the tread portion, lug grooves with both ends communicating to one of the main grooves are provided in each of the middle land portions defined by the four main grooves, and notch portions are provided on the opening edges of the lug grooves. In the pneumatic tire of the Conventional Example, the groove width of the lug groove and the notch width of the notch portion do not change. In the pneumatic tire of the Comparative Example, the groove width of the lug groove is unchanging, and the notch width of the notch portion increases toward the ends of the lug groove. In the pneumatic tires of Examples 1 to 8, the groove width of the lug groove decreases toward the ends, and the notch width of the notch portion increases toward the ends of the lug groove.

As can be seen from the test results in FIGS. 9A-9B, the pneumatic tires of Examples 1 to 8 have enhanced pattern noise and wet performance can be maintained.

The invention claimed is:

1. A pneumatic tire, comprising:
in a tread surface, main grooves extending in a tire circumferential direction;
a land portion defined by two of the main grooves adjacent in a tire lateral direction;
lug grooves arranged in the tire circumferential direction in the tread surface of the land portion, the lug grooves each crossing the tire circumferential direction and communicating at both ends with the main grooves, defining the land portion in the tire circumferential direction; and
a notch portion formed on an opening edge of the lug grooves, the notch portion being a cutout from the tread surface cut inward in a tire radial direction;
the lug grooves having a maximum groove width at a position from 30% to 70% of a tire lateral direction dimension of the land portion from one of the main grooves and a groove width that decreases from the maximum groove width to the main grooves; and
the notch portion having a notch width that increases from a position of the maximum groove width of the lug grooves to the main grooves; wherein
at a position $0.50 \times L$, a relationship $0.80 \times y0 < y \leq 0.98 \times y0$ is satisfied;
at a position $0.80 \times L$, a relationship $0.60 \times y0 < y \leq 0.90 \times y0$ is satisfied; and
at a position $1.00 \times L$, a relationship $0.30 \times y0 < y \leq 0.50 \times y0$ is satisfied, where L is a tire lateral direction dimension from a maximum groove width position of the lug grooves to a position where the lug grooves communicate with the main grooves, y0 is a maximum groove width of the lug grooves, and y is a groove width of the lug grooves at a discretionary position located further outward in the tire lateral direction than the maximum groove width position of the lug grooves.

2. The pneumatic tire according to claim 1, wherein relationships $0 \leq x0 < x$ and $0.2(y0-y)+x0 \leq x \leq 2.0(y0-y)+x0$ are satisfied, where y0 is a maximum groove width of the lug grooves, x0 is the notch width of the notch portion at the maximum groove width position of the lug grooves, y is a groove width of the lug grooves at a discretionary position located further outward in the tire lateral direction than the maximum groove width position of the lug grooves, and x is a notch width of the notch portion at a discretionary position.

3. The pneumatic tire according to claim 2, wherein the notch portion has a notch depth from the tread surface inward in the tire radial direction of from 0.5 mm to 3.0 mm.

4. The pneumatic tire according to claim 3, wherein
a rotation direction is designated; and
a relationship $xb < xa \leq 3.0xb$ is satisfied, where xa is a notch width of the notch portion located on a trailing side of the land portion in the tire circumferential direction with respect to the lug grooves, and xb is a notch width of the notch portion located on a leading side.

5. The pneumatic tire according to claim 4, wherein the lug grooves have a groove depth G at a position where the lug grooves communicate with the main grooves and a groove depth G0 at a maximum groove width position that satisfies a range $0.2 \times G0 \leq G \leq 0.6 \times G0$.

6. The pneumatic tire according to claim 1, wherein the notch portion has a notch depth from the tread surface inward in the tire radial direction of from 0.5 mm to 3.0 mm.

7. The pneumatic tire according to claim 1, wherein
a rotation direction is designated; and
a relationship $xb < xa \leq 3.0xb$ is satisfied, where xa is a notch width of the notch portion located on a trailing side of the land portion in the tire circumferential direction with respect to the lug grooves, and xb is a notch width of the notch portion located on a leading side.

8. The pneumatic tire according to claim 1, wherein the lug grooves have a groove depth G at a position where the lug grooves communicate with the main grooves and a groove depth G0 at a maximum groove width position that satisfies a range $0.2 \times G0 \leq G \leq 0.6 \times G0$.

9. The pneumatic tire according to claim 1, wherein
a vehicle inner/outer side orientation when mounted on a vehicle is designated; and
the lug grooves have a groove width at a position where the lug grooves communicate with the main grooves that is smaller on the vehicle outer side than on the vehicle inner side.

10. A pneumatic tire, comprising:
in a tread surface, main grooves extending in a tire circumferential direction;
a land portion defined by two of the main grooves adjacent in a tire lateral direction;
lug grooves arranged in the tire circumferential direction in the tread surface of the land portion, the lug grooves each crossing the tire circumferential direction and communicating at both ends with the main grooves, defining the land portion in the tire circumferential direction; and
a notch portion formed on an opening edge of the lug grooves, the notch portion being a cutout from the tread surface cut inward in a tire radial direction;
the lug grooves having a maximum groove width at a position from 30% to 70% of a tire lateral direction dimension of the land portion from one of the main grooves and a groove width that decreases from the maximum groove width to the main grooves; and the notch portion having a notch width that increases from a position of the maximum groove width of the lug grooves to the main grooves; wherein:
relationships $0 \leq x0 < x$ and $0.2(y0-y)+x0 \leq x \leq 2.0(y0-y)+x0$ are satisfied, where y0 is a maximum groove width of the lug grooves, x0 is the notch width of the notch portion at the maximum groove width position of the lug grooves, y is a groove width of the lug grooves at a discretionary position located further outward in the tire lateral direction than the maximum groove width position of the lug grooves, and x is a notch width of the notch portion at a discretionary position;
the notch portion has a notch depth from the tread surface inward in the tire radial direction of from 0.5 mm to 3.0 mm;
a rotation direction is designated;
a relationship $xb < xa \leq 3.0xb$ is satisfied, where xa is a notch width of the notch portion located on a trailing side of the land portion in the tire circumferential direction with respect to the lug grooves, and xb is a notch width of the notch portion located on a leading side;
the lug grooves have a groove depth G at a position where the lug grooves communicate with the main grooves and a groove depth G0 at a maximum groove width position that satisfies a range $0.2 \times G0 \leq G \leq 0.6 \times G0$;

a vehicle inner/outer side orientation when mounted on a vehicle is designated; and the lug grooves have a groove width at a position where the lug grooves communicate with the main grooves that is smaller on the vehicle outer side than on the vehicle inner side;

at a position $0.50 \times L$, a relationship $0.80 \times y0 \leq y \leq 0.98 \times y0$ is satisfied;

at a position $0.80 \times L$, a relationship $0.60 \times y0 \leq y \leq 0.90 \times y0$ is satisfied; and at a position $1.00 \times L$, a relationship $0.30 \times y0 \leq y \leq 0.50 \times y0$ is satisfied, where L is a tire lateral direction dimension from a maximum groove width position of the lug grooves to a position where the lug grooves communicate with the main grooves, y0 is a maximum groove width of the lug grooves, and y is a groove width of the lug grooves at a discretionary position located further outward in the tire lateral direction than the maximum groove width position of the lug grooves.

* * * * *